March 31, 1942.  O. G. HESS ET AL  2,277,908
AUTOMOBILE JACKING APPARATUS
Filed March 17, 1941   3 Sheets-Sheet 3

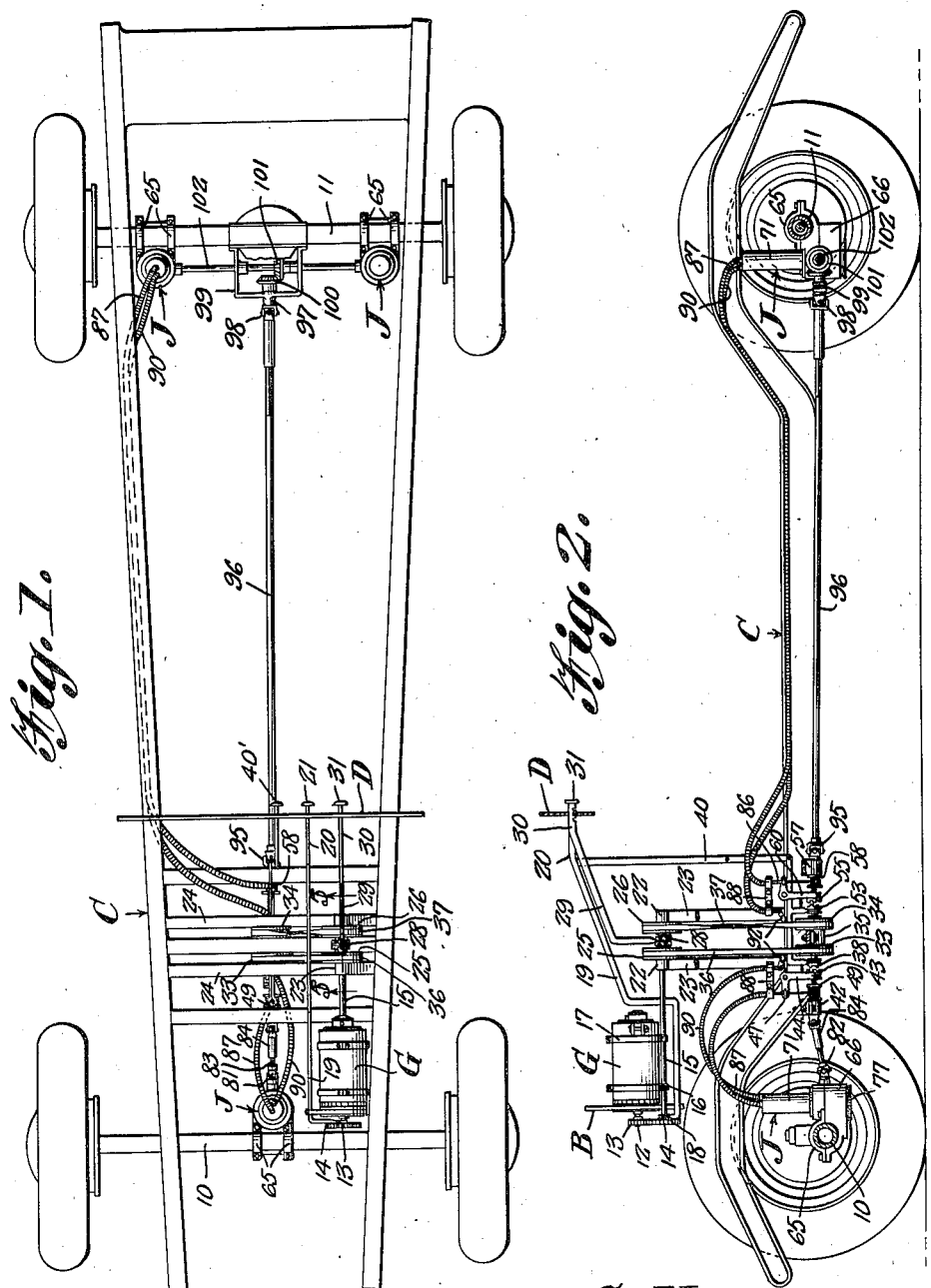

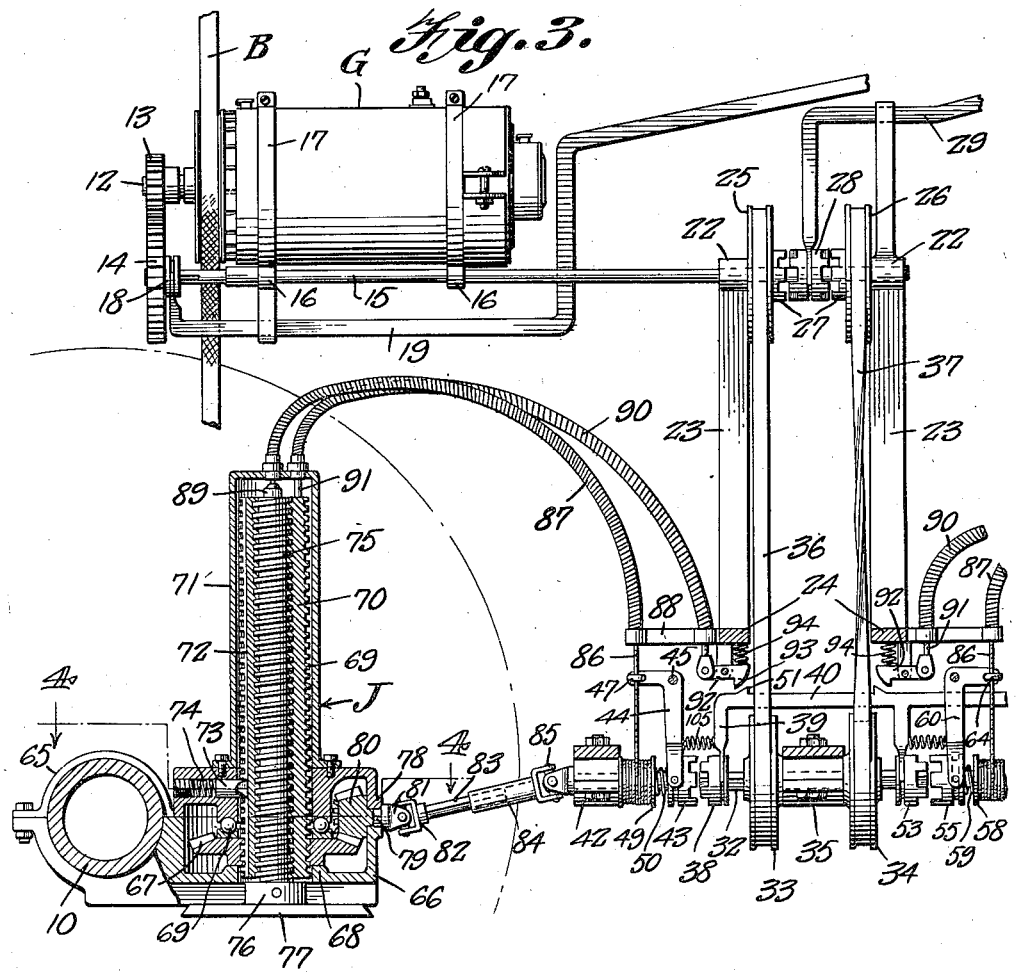

Onley G. Hess,
Wesley J. Glenn,
INVENTORS

BY Victor J. Evans & Co.
ATTORNEYS

WITNESS

Patented Mar. 31, 1942

2,277,908

UNITED STATES PATENT OFFICE 2,277,908

AUTOMOBILE JACKING APPARATUS

Onley George Hess, Port Huron, and Wesley J. Glenn, Jeddo, Mich.

Application March 17, 1941, Serial No. 383,852

4 Claims. (Cl. 254—86)

The present invention relates to improvements in jacking apparatus for automobiles and has for an object thereof to provide an automobile jacking apparatus of generally improved construction.

Another object of the invention is the provision of a jacking apparatus which is designed for attachment to the chassis of an automobile and for easy control from a conveniently accessible position thereon.

A further object of the invention is the provision of automobile jacking apparatus of the above character which is relatively inexpensive in construction and which can be readily mounted on the chassis of an automobile.

Still another object of the invention is the provision of an automobile jacking apparatus of the aforesaid character which is efficient and reliable in operation.

Other objects and advantages of the invention will become apparent as the description progresses.

Figure 4:
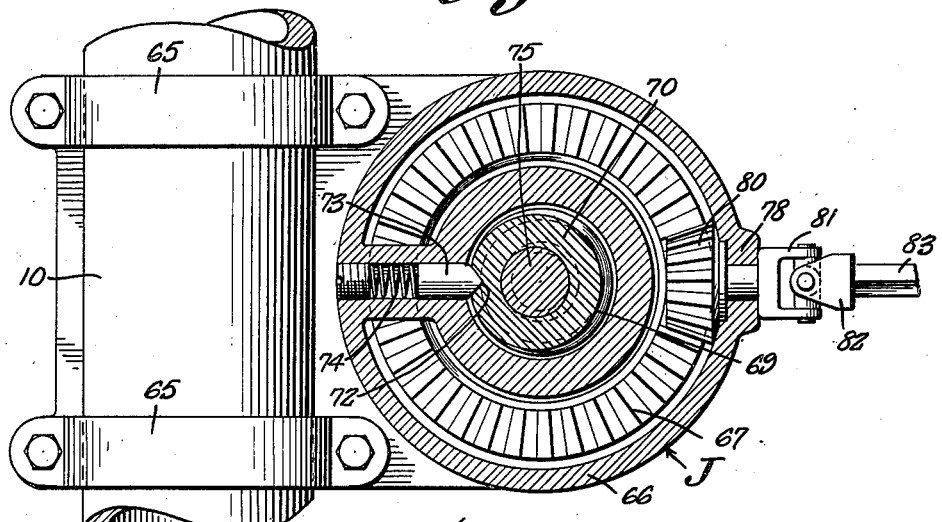
Figure 5:
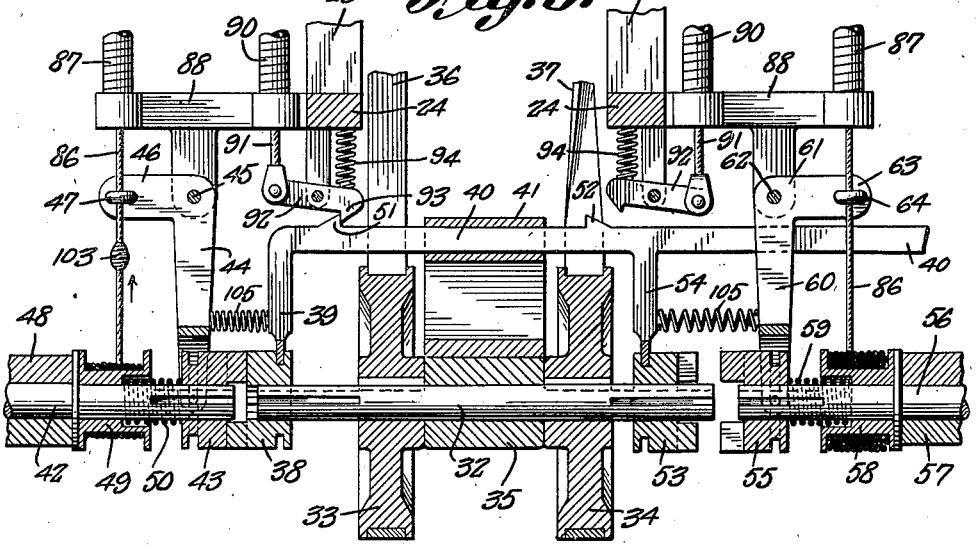

In the accompanying drawings forming a part of this specification and in which like numerals are employed to designate corresponding parts throughout:

Figure 1 is a top plan view showing the improved apparatus installed on the chassis of an automobile, Figure 2 is a side elevational view of the same, Figure 3 is an enlarged fragmentary side elevational view of the apparatus with parts in section, Figure 4 is an enlarged transverse sectional view taken approximately on line 4—4 of Figure 3, Figure 5 is an enlarged longitudinal sectional view taken on line 5—5 of Figure 1.

Referring to the drawings, wherein for the purpose of illustration is shown a preferred example of the invention, C generally designates a conventional chassis frame of an automobile having a front axle 10 and a rear axle housing 11. Supported on the upper forward portion of the frame, in the usual manner, is a generator G having connected to the shaft thereof, for the purpose of the present apparatus, the forwardly projecting shaft extension 12 on which is secured a spur pinion 13 disposed to mesh with a relatively large spur gear 14. As is known in the automotive art the generator shaft is commonly driven by a belt B having direct or indirect connection with the motor drive shaft.

The gear 14 is slidably keyed upon the forward end of a longitudinally extending drive shaft 15 journaled in bearings 16 attached to the generator housing by clamps 17. At one side of the gear 14 is provided a grooved boss 18 with which is connected the yoke of an angular shifting rod 19 having a horizontal rear extension 20 projecting through an aperture in the vehicle dash board D and fitted with an operating knob 21. The inner portion of the shaft 15 is supported in bearings 22 formed on the upper ends of brackets 23 attached to cross bars 24 on the frame C. Between the bearings 22 the shaft 15 carries a pair of spaced loose pulleys 25 and 26 formed with inwardly directed notched hub portions 27 designed to form clutch elements. Between the elements 27 this shaft carries a clutch section 28 keyed to the shaft 15 and slidable thereon. The opposed faces of the clutch section 28 are formed with teeth engageable with the notches in the pulley sections 27 so that the clutch element 28 may be selectively disposed to effect driving engagement with either of the sections 27 or in an intermediate non-driving position. The sliding clutch element 28 is actuated through the medium of an angular operating rod 29 formed at its rear end with a horizontal extension 30 extending through the dash board D and carrying a knob 31 at its rear end.

On a horizontally disposed counter shaft section 32, arranged below and laterally of the shaft 15, are mounted a pair of spaced pulleys 33 and 34 fixed on the shaft at each side of a support bearing 35. A direct drive belt 36 is drivably trained over the opposed pulleys 25 and 33 while a crossed belt 37 is trained over the complementary pulleys 26 and 34. On the forward side of the pulley 33 the shaft 32 carries a grooved clutch element 38 keyed on the shaft 32 and slidably movable thereon by a shift arm 39 directed downwardly from a horizontally extending operating bar 40 slidably supported in a bearing 41. On a coextensive shaft 42 disposed forwardly and in alignment with the shaft 32 is mounted a clutch element 43 having cooperative relation with the element 38 and pivotally connected with the lower forked end of a bell crank lever 44. This lever is pivotally supported on a pin 45 and has an arm 46 extending at approximately right angles to the main depending arm 44, the arm 46 carrying at its outer end portion an eye 47. The clutch element 43 is slidably keyed on the shaft section 42 and the latter is journaled in a bearing 48. Adjacent the bearing 48 the shaft 42 carries a rotary winding drum 49 which is yieldingly forced from the clutch element 43 by a compression spring 50 sleeved about the shaft 42 as shown to advantage at Figure 5. At longitudinally spaced positions on the rod 40 are formed upwardly projecting angular teeth 51 and 52 for a purpose which will be hereinafter described.

Adjacent the pulley 34 the shaft 32 carries a clutch element 53 keyed thereon and operable by a shifting arm 54 attached to the rod 40. This clutch element is in cooperative relation with a complementary element 55 slidably keyed on a shaft section 56 in axial alignment with the section 32 and journaled in a bearing 57. The section 56 carries thereon a rotary drum 58 yieldingly urged from the clutch element 55 by a spring 59. This clutch element 55 is pivotally connected with the lower forked end of the depending leg 60 of a bell crank lever 61 rockably supported on a pivot pin 62 and formed with a rearwardly directed arm 63 carrying an eye 64.

To the center portion of the front axle 10 is fastened, by detachable clamp members 65, a circular gear casing 66 having mounted horizontally therein a beveled ring gear 67 supported between thrust bearings 68 and 69. This ring gear is interiorly screw threaded to engage the exterior threads 69 of a tubular jack lift section 70 mounted vertically in the casing 66 and in an extension housing 71 secured thereon. Along one side the shaft section 70 is formed with a full length groove 72 into which is normally projected the inner beveled end of a pin 73 mounted in the casing 66 radially of the jack section and yieldingly urged into the groove by a coiled compression spring 74.

Within the jack section 70 is positioned a complementary lift section 75 exteriorly screw threaded to engage the interiorly threaded bore of the exterior tubular section 70. On the bottom end of the jack section 75 is secured the upper boss 76 of a foot plate 77, as shown in Figure 3.

In a bearing opening 78 formed at the rear side of the casing 66 is journaled a stub shaft 79 formed at its inner end with a beveled pinion 80 in mesh with the screw gear 67 and provided at its outwardly projecting end with a U-shaped joint section 81. This section connects with the complementary universal joint section 82 fastened on the outer end of a shaft section 83 of non-circular cross section slidably engaging a correspondingly shaped bore of a complementary shaft section 84. The rear end of this latter section is connected, by a universal joint 85, with the forward end of the drive shaft section 42.

A flexible cable 86 having one end attached to the drum 49 and adapted for winding thereon is extended upwardly from the drum through the eye 47 and through a flexible tubular sheath 87 which extends from the guide bore of a horizontal bracket arm 88 to a center aperture in the top of the jack shaft housing 71. The outer end of the cable 86 is attached to the upper end of the shaft section 75 as indicated at 89. A similar tube 90 extends from a second opening in the housing 71 to another guide opening in the bracket 88 and provides a sheath for a flexible cable 91 which projects into the top of the housing 71 in registration with the top edge portion of the jack shaft section 70. The opposite end of the cable 91 is pivotally connected with one end of a pivoted latch lever 92 formed at its free end with a hook 93 yieldingly urged to a downward locking position by a coil spring 94.

The rear end of the shaft section 56 is connected, through the medium of a universal joint 95 with a rearwardly extending connecting shaft 96 which joins a stub shaft 97 through the medium of a universal joint 98. The stub shaft 97 is journaled horizontally in a bearing sleeve secured to the forward portion of a rectangular bracket 99 fastened to the rear axle housing 12. This stub shaft carries a bevel gear 100 having driving engagement with a complementary bevel gear 101 secured on a transversely mounted drive shaft 102 journaled on the bracket 99. Each end of the shaft 102 connects with a jack shaft unit designated at J and corresponding to the unit mounted on the front axle hereinbefore described, the rear units being clamped to the rear housing at points spaced inwardly of the longitudinal frame bars as shown to advantage at Figure 1.

The apparatus operates as follows:

To operate the front jack the driver depresses control knob 21 which shifts the gear 14 into engagement with the power take-off, that is, the drive gear 13 secured on the extension of the generator shaft, to rotate the shaft 15. He then depresses knob 31 to slide the clutch element 28 into engagement with the clutch of the pulley 25 so as to lock this pulley with the rotating shaft 15, which, through the instrumentality of the belt drive, rotatably actuates the shaft section 32. The knob indicated at 40' is then depressed toward the dash or instrument board to slidingly actuate the member 40 which functions to slide the clutch elements 38 and 53 forwardly on the shaft section 32 and causes the element 38 to engage the complementary clutch element 43 to effect driving connection of the shaft sections 32 and 42 and, through the extension shaft sections 83 and 84, to drive the pinion 80. This latter pinion rotates the screw gear 67 so as to extend the vertical jack lift member 70 which is releasably held against rotation by the beveled pin 73. This initial extension stroke of the jack brings the foot 77 into contact with the ground and the friction effected thereby causes release of the pin 73 so that continuing rotary movement of the screw gear 67 rotates the exterior lift section 70 with relation to the interior telescopic lift member 75 whereby to extend the latter and effect the second stroke of the jack extension and elevate the forward portion of the vehicle. When the telescopic lift sections have attained predetermined extended positions the cable 86 attached thereto will have been unwound from the drum 49 to the extent that an abutment, such as the shoulder piece 103, will engage the eye 47 to swing the lever 45 against the action of the compression spring 50 and slide the clutch element 43 forwardly out of engagement with the complementary section 38, to disconnect the jack mechanism from the driving shaft section 32. When the shift member 40 was actuated through its initial forward movement to actuate the clutch elements the hooked end 93 of the catch lever 92, yieldingly depressed by a spring 94, engaged the tooth 51 to restrain rearward movement thereof.

To retract the front jack for lowering the forward part of the vehicle the button 31 is pulled outward so as to shift the clutch element 28 into engagement with the complementary clutch element on the pulley 26 and, through the medium of the crossed belt connection, cause rotation of the shaft section 32 in reverse direction. The button 40' is then momentarily depressed to move the clutch shift member 40 a further step forward and bring the clutch element 38 into engagement with the retracted complementary element 43 to drive the screw gear 67 in lift retracting direction whereupon the cable 86 is wound upon the drum 49, which is frictionally rotated on the shaft section 42, to disengage the abutment 103 from the eye 47 for releasing the lever 44 and allow the clutch element to slide rearwardly in engagement with the element 38 to their normal engaging positions. When the telescopic lift sections 70 and 75 are fully retracted the upper edge of the tubular section 70 engages the end of the cable 91 which is acted upon to thrust the outer end of the lever 92 downwardly and elevate the hooked end against the action of the spring 104 whereby to release the tooth 51 and slide the clutch shift member 40 rearwardly to its neutral position through the action of a compression spring 105 mounted to extend between the lever arm 44 and the arm 39.

The rear jacks of the vehicle are similarly operated, the knob 40' being pulled outward to effect the initial rearward movement of the shifting member 40 which brings the clutch element 53 into engagement with the complementary element 55 for driving the shaft sections 56, 96 and 102 for extension of the rear jack lifts. These rear lifts are retracted by initially pulling the knob 40' a step farther whereupon the action follows that described for the retraction of the front jack.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In jacking apparatus of the character described, a jack casing, a tubular jack lift member mounted in the casing and movable to extended position, the said lift member being interiorly and exteriorly screw threaded, a second lift member telescopically mounted within the tubular member and threadedly engaging the interior thereof, a foot attached to a downward extension on the interior lift member, a ring gear rotatably mounted in the casing and threadedly engaging the exterior lift member for extending and retracting the said member, gear mechanism in mesh with the said ring gear for reversibly operating the same, a spring pressed element engageable with a longitudinal groove in the exterior lift member for releasably holding the said member against rotation, drive mechanism releasably engageable with the gear mechanism for actuating the jack lift members, the said drive mechanism being operable by a power take-off on the vehicle, and means operable to automatically disconnect the drive mechanism from the jack gear mechanism when the jack lift members are extended and retracted.

2. In jacking apparatus of the character described, a jack having an extensible lift, a rotary drive shaft, an extension shaft connected with the jack for operating the lift, a pair of clutch sections yieldingly urged to releasably connect the extension shaft with the drive shaft, a pivoted lever connected with one of the said clutch sections and operative to move the same to disengaged position, a flexible connecting element connected with the jack lift and with the extension shaft for movement therewith, and an abutment on the said flexible element operable to actuate the lever to effect disconnection of the extension shaft from the drive shaft when the jack lift assumes a predermined position.

3. In jacking apparatus for an automotive vehicle including a frame and a generator mounted thereon, a drive gear fixed on the shaft of the generator, a drive shaft rotatably supported on the frame, transmission mechanism for rotating the drive shaft from the generator gear, means for releasably connecting the said drive shaft with the transmission mechanism, an extensible jack mounted on the vehicle, an extension shaft connected with the said jack for operating the same, means for releasably connecting the extension shaft with the drive shaft, and means connected to the jack operative to automatically actuate the releasable shaft connecting means for disconnecting the extension shaft from the drive shaft at predetermined arrangement of the jack.

4. In jacking apparatus for an automotive vehicle, a jack casing adapted for fixed connection with a cross member of the vehicle, a normally retracted lift mounted in the casing and extensible downwardly thereof for engagement with the ground to elevate the vehicle, a rotary drive shaft supported on the vehicle, an extension shaft connected with the jack for operating the lift, clutch mechanism for releasably connecting the said extension shaft with the drive shaft, a lever for operating the said clutch mechanism, a flexible connecting element connected with the jack lift and with the extension shaft for movement therewith, and an abutment on the said flexible element operable to actuate the said lever to effect disconnection of the extension shaft from the drive shaft when the jack lift assumes predetermined extended position.

ONLEY GEORGE HESS.
WESLEY J. GLENN.